United States Patent
Huang et al.

(10) Patent No.: US 11,927,937 B1
(45) Date of Patent: Mar. 12, 2024

(54) PREDICTION METHOD FOR TOOL REMAINING LIFE OF NUMERICAL CONTROL MACHINE TOOL BASED ON HYBRID NEURAL MODEL

(71) Applicant: INSTITUTE OF INDUSTRIAL INTERNET, CHONGQING UNIVERSITY OF POSTS AND TELECOMMUNICATIONS, Chongqing (CN)

(72) Inventors: Qingqing Huang, Chongqing (CN); Yan Han, Chongqing (CN); Zhen Kang, Chongqing (CN); Yan Zhang, Chongqing (CN); Ping Wang, Chongqing (CN)

(73) Assignee: INSTITUTE OF INDUSTRIAL INTERNET, CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/498,974

(22) Filed: Oct. 31, 2023

Related U.S. Application Data

(63) Continuation of application No. PCT/CN2022/099990, filed on Jun. 21, 2022.

(30) Foreign Application Priority Data

Jun. 22, 2021 (CN) .......................... 202110690654.1

(51) Int. Cl.
G05B 19/4065 (2006.01)

(52) U.S. Cl.
CPC ............... *G05B 19/4065* (2013.01); *G05B 2219/32335* (2013.01); *G05B 2219/37252* (2013.01); *G05B 2219/37434* (2013.01)

(58) Field of Classification Search
None
See application file for complete search history.

(56) References Cited

FOREIGN PATENT DOCUMENTS

| CN | 110472800 A | 11/2019 |
|----|-------------|---------|
| CN | 112631128 A | 4/2021  |

OTHER PUBLICATIONS

"Neural factorization machines for sparse predictive analytics" He Xiangnan.ChuaTS,p. 355-364; Proceedings of the 40th InternationalACM SIGIR conference on Research and Development in InformationRetrieval Aug. 16, 2017.

*Primary Examiner* — Sean Shechtman

(57) ABSTRACT

Disclosed is a prediction method for tool remaining life of a numerical control machine tool based on a hybrid neural model, including: constructing a hybrid neural network model, specifically including the following steps: constructing sample data according to the sampling frequency of tool data; obtaining a first feature vector representing the tool life by utilizing a convolutional neural network and a long short-term memory network; generating working condition signals of sampling points into a second feature vector representing the tool life by utilizing an NFM neural network; and inputting a current working time of a tool and the acquired feature vectors into a multi-layer perceptron for fusion to predict the tool life.

5 Claims, 4 Drawing Sheets

PREDICTION METHOD FOR TOOL REMAINING LIFE OF NUMERICAL CONTROL MACHINE TOOL BASED ON HYBRID NEURAL MODEL

CROSS-REFERENCE TO RELATED APPLICATIONS

This application is a continuation of PCT/CN2022/099990, filed Jun. 21, 2022 and claims priority of Chinese Patent Application No. 202110690654. 1, filed on Jun. 22, 2021, the entire contents of which are incorporated herein by reference.

TECHNICAL FIELD

The present disclosure belongs to the field of tool life prediction of numerical control machine tools, and in particular relates to a prediction method for tool remaining life of a numerical control machine tool based on a hybrid neural model.

BACKGROUND

As an important tool in the industrial manufacturing process, the life and wear state of a tool affect the production quality of a workpiece, production efficiency and the health of a lathe. If the remaining life of the tool can be accurately predicted, the cost of industrial manufacturing will be effectively reduced. Tool wear measurement methods can roughly include a direct method and an indirect method. The direct measurement needs to measure the actual wear by different methods, such as optical measurement, radioactive analysis and resistance measurement. However, it is difficult to directly measure tool wear between or during machining operations. The other method is the indirect measurement, and the indirect method to detect the tool state according to the relationship between the tool condition and measurable signals (such as force, acoustic emission, vibration and current) has been widely studied. For example, by using force, vibration and acoustic emission (AE) signals, Sun et al. predicted the remaining life value of cutting tools based on operational reliability evaluation and back propagation neural network (BPNN).

A traditional machine learning method needs to extract features manually, which has great limitations. A deep learning model can automatically extract features from a large number of real-time data, and a deep network structure gives it strong nonlinear learning ability, which effectively makes up for the shortcomings of the traditional machine learning method. Zhou et al. proposed a prediction method of tool remaining service life under variable working conditions based on an LSTM network. According to factors affecting tool wear, the unified representation of working conditions is established, and wear characteristics are extracted from the process monitoring signals. The extracted wear characteristics and other working conditions are utilized to construct feature vectors to capture the complex time-space relationship under the variable working conditions. Based on unique advantages of an LSTM model in solving problems with complex correlation and memory accumulation effect, a prediction model for the tool remaining service life under the variable working conditions is established. Zhao et al. proposed a local feature-based gated recurrent unit (LFGRU) network, which further designed an improved bidirectional GRU automatic extraction of deep features after manual features, and added a supervised learning layer at the last layer of the neural network to predict the machine state. The effectiveness and generalization ability of the proposed LFGRU are verified by the experiments of three machine health monitoring tasks: tool wear prediction, gearbox fault diagnosis and initial bearing fault detection. Meng et al. proposed a novel convolution-based long short-term memory (CLSTM) network to predict the RUL of excavating in-situ vibration data by rotating machinery. Different from the research of simply connecting the convolutional neural network (CNN) to the long short-term memory (LSTM) network in series, the proposed network performs convolutional operation on the transformation of the input-to-state and the state-to-steady state of LSTM. The transformation contains time-frequency and time information of the signal, which not only retains the advantages of LSTM, but also contains time-frequency features. A convolution structure in LSTM has the ability to capture long-term dependence and extract features from a time-frequency domain. By stacking multiple CLSTM layer by layer, the coding prediction architecture is formed, and a deep learning model of RUL prediction is established. Sun et al. proposed a deep transmission learning (DTL) network based on sparse auto-encoders. In a DTL method, three transfer strategies, namely weight transfer, hidden feature transfer learning and weight update, are adopted to transfer SAE trained by historical fault data to new objects. Through these strategies, the prediction training of new targets without supervised information is realized. Zhang et al. proposed a dynamic system performance tracking and subsequent RUL prediction method based on deep learning. LSTM, taken as a model, is utilized to track the degradation of the system because of its powerful function in discovering change patterns of a time series. However, at present, there is no good solution to the sparse features in the tool, which is studied in this patent.

SUMMARY

Aiming at sparse features in tools, the present disclosure provides a prediction method for tool remaining life of a numerical control machine tool based on a hybrid neural model, including: constructing a hybrid neural network model, the model including a convolutional neural network, a long short-term memory network and an NFM neural network, the prediction of the tool remaining life of the numerical control machine tool specifically including the following steps:

S1: constructing samples of PLC working condition signal data and vibration and current signals in a same time period according to the sampling frequency of tool data, and generating sample data based on low frequency PLC sampling points;

S2: learning the sample data by utilizing a sub-model combined by the convolutional neural network and the long short-term memory network to obtain a first feature vector representing the tool life;

S3: generating a learnable vector table of a specific dimension after hashing a working condition signal of each sampling point into a unique index value by utilizing the NFM neural network, and acquiring a second feature vector representing the tool life through Bi-Interaction Pooling layer learning; and S4: inputting a current working time of a tool, the first feature vector representing the tool life and the second feature vector representing the tool life into a multi-layer perceptron for fusion, and then learning a whole network structure.

Further, the process of learning to obtain the first feature vector representing the tool life includes the following steps:

S21: acquiring an average value of vibration data collected by a sensor by utilizing a triangle window, extracting a variance by a rectangle window to detect abnormal values, filling the average value into abnormal points, performing moving average sequence filtering on the collected current signals, and standardizing the overall data;

S22: building a convolutional neural network layer, performing convolution operation on an input current signal and a vibration signal sequence through K convolution kernels of the convolution layer to obtain K feature vectors, and pooling each feature vector after convolution layer through a maximum pooling layer to obtain a time series containing K local features;

S23: building a single-layer long-term and short-term memory layer, and obtaining a time series containing historical time information through an LSTM layer containing N LSTM neural units; and S24: acquiring N eigenvalues of LSTM neurons by separately utilizing a Global Average Pooling layer and a Global Max Pooling layer, and taking 2*N eigenvalues as the first feature vector representing the tool life.

Further, the convolutional neural network layer includes three convolution units, one convolution unit includes a convolution layer and a maximum pooling layer, and three convolution units are adopted.

Further, the process of acquiring the second feature vector representing the tool life includes the following steps:

S31: establishing an I*M vector table according to an index after hash coding the PLC working condition signal data, the vector table being expressed as: $V_x = \{x_i v_i\}$, I being the index number, M being the embedding dimension, $x_i$ being an input vector, $v_i$ being a mapping vector, and $V_x$ being a vector set; and S32: acquiring the second feature vector representing the tool life by the acquired vector table $V_x$ through the action of a Bi-Interaction layer.

Further, the action process of the vector table $V_x$ through the Bi-Interaction layer is expressed:

$$f_{BI}(V_x) = \sum_{i=1}^{n} \sum_{j=i+1}^{n} x_i v_i \odot x_j v_j$$

$f_{BI}(V_x)$ being the second feature vector representing the tool life, n being the index number, and $\odot$ representing an element-wise product of two vectors.

Further, in the process of training the hybrid neural network model, a Dropout layer is added after a pooling layer of the convolutional neural network, a Bi-Interaction pooling layer of the NFM neural network and each fully connected layer, and a Batch Normalization layer is added after the LSTM layer and the fully connected layer; in the back propagation of the neural network, Adam is utilized to optimize an optimal model, and in the process of optimization, a learning rate is reduced when the loss of epoch verification data no longer decreases every n times, and the training is stopped when the loss of verification data no longer decreases at least N times during training.

The prediction method for the tool remaining life of a numerical control machine tool based on a hybrid neural model provided by the present disclosure can effectively and accurately predict the tool life according to the sparse features of the tool.

DETAILED DESCRIPTION

Figure 1:
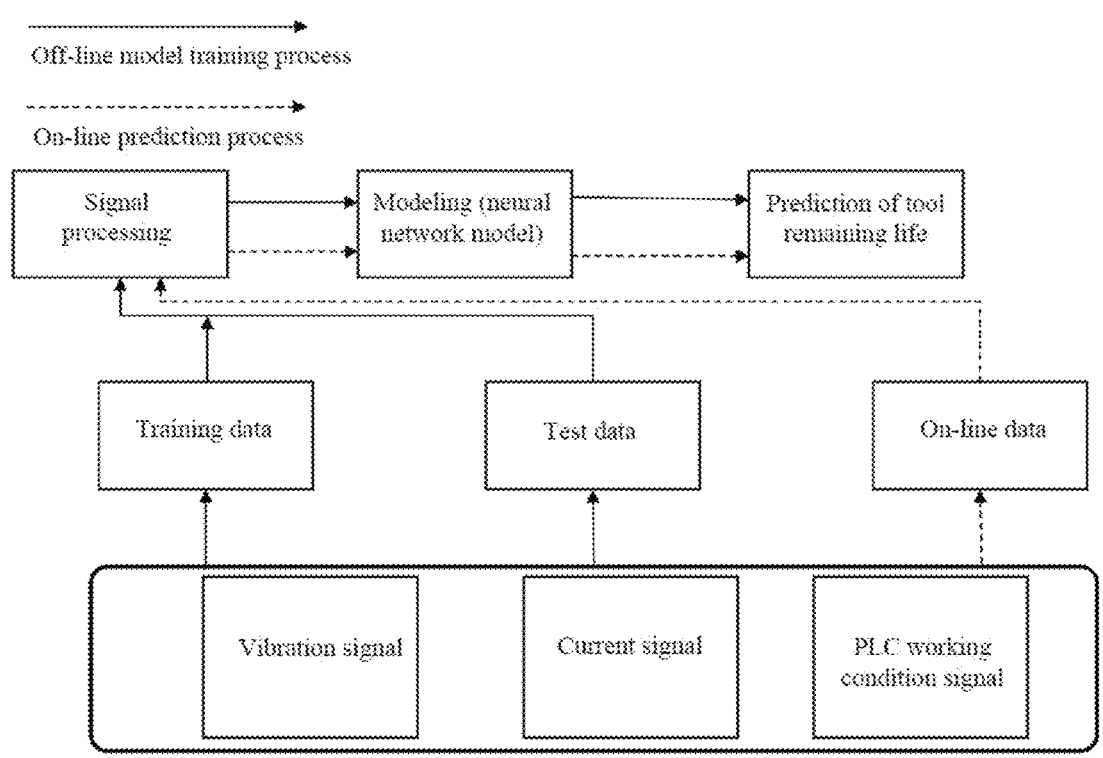
FIG. 1 is a schematic flow chart of a prediction method for tool remaining life of a numerical control machine tool according to the present disclosure.

Technical solutions in the examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

The present disclosure provides a prediction method for tool remaining life of a numerical control machine tool based on a hybrid neural model, including: constructing a hybrid neural network model, the model including a convolutional neural network, a long short-term memory network and an NFM neural network, the prediction of the tool remaining life of the numerical control machine tool specifically including the following steps.

At S1: samples of PLC working condition signal data and vibration and current signals in a same time period are constructed according to the sampling frequency of tool data, and sample data is generated based on low frequency PLC sampling points. In the example, a large number of sample data can be generated; these sample data can be collected by sample collection devices (such as sensors and/or cameras) and stored by storage devices (such as memory, mobile hard disk and other hardware facilities).

At S2: a large number of sample data are learned by utilizing a sub-model combined by the convolutional neural network and the long short-term memory network to obtain a first feature vector representing the tool life. In the example, the sub-model combined by the convolutional neural network and the long short-term memory network can be obtained through repeated iterations (for example, the number of iterations is 100, 1000 or more). In the example, a large amount of computations will be generated due to repeated loop iterations, so a large computer or a cloud server can be adopted to perform loop iterations to improve the operation speed.

At S3: a learnable vector table of a specific dimension is generated after hashing a working condition signal of each sampling point into a unique index value by utilizing the NFM neural network, and a second feature vector representing the tool life is acquired through Bi-Interaction Pooling layer learning. In the example, the NFM neural network can be obtained through repeated loop iterations (for example, the number of iterations is 100, 1000 or more). In the example, a large amount of computations will be generated due to repeated loop iterations, so a large computer or a cloud server can be adopted to perform loop iterations to improve the operation speed.

At S4: a current working time of a tool, the first feature vector representing the tool life and the second feature vector representing the tool life are inputted into a multi-layer perceptron for fusion, and then a whole network structure is learned.

Further, the process of learning to obtain the first feature vector representing the tool life includes the following steps.

At S21: an average value of vibration data collected by a sensor is acquired by utilizing a triangle window, a variance is extracted by a rectangle window to detect abnormal values, the average value is filled into abnormal points, moving average sequence filtering is performed on the collected current signals, and the overall data is standardized. In the example, a large amount of computations will be generated due to the extraction of variance to detect abnormal values, the filling of the abnormal values with the average value, filtering operations and standardization operations, so a large computer or a cloud server can be adopted to perform these operations, thus improving the operation speed.

At S22: a convolutional neural network layer is built, convolution operation is performed on an input current signal and a vibration signal sequence through K convolution kernels of the convolution layer to obtain K feature vectors, and each feature vector after convolution layer is pooled through a maximum pooling layer to obtain a time series containing K local features.

At S23: a single-layer long short-term memory layer is built, and a time series containing historical time information is obtained through an LSTM layer containing N LSTM neural units.

At S24: N eigenvalues of LSTM neurons are acquired by separately utilizing a Global Average Pooling layer and a Global Max Pooling layer, and 2*N eigenvalues are taken as the first feature vector representing the tool life.

Further, the convolutional neural network layer includes three convolution units, one convolution unit includes a convolution layer and a maximum pooling layer, and three convolution units are adopted.

Further, the process of acquiring the second feature vector representing the tool life includes the following steps.

At S31: an I*M vector table is established according to an index after hash coding the PLC working condition signal data, the vector table being expressed as: $V_x = \{x_i v_i\}$, I being the index number, M being the embedding dimension, $x_i$ being an input vector, $v_i$ being a mapping vector, and $V_x$ being a vector set.

At S32: the second feature vector representing the tool life is acquired by the acquired vector table $V_x$ through the action of a Bi-Interaction layer.

Further, the action process of the vector table $V_x$ through the Bi-Interaction layer is expressed:

$$f_{BI}(V_x) = \sum_{i=1}^{n} \sum_{j=i+1}^{n} x_i v_i \odot x_j v_j$$

$f_{BI}(V_x)$ being the second feature vector representing the tool life, n being the index number, and $\odot$ representing an element-wise product of two vectors.

Further, in the process of training the hybrid neural network model, a Dropout layer is added after a pooling layer of the convolutional neural network, a Bi-Interaction pooling layer of the NFM neural network and each fully connected layer, and a Batch Normalization layer is added after the LSTM layer and the fully connected layer; in the back propagation of the neural network, Adam is utilized to optimize an optimal model, and in the process of optimization, a learning rate is reduced when the loss of epoch verification data no longer decreases every n times, and the training is stopped when the loss of verification data no longer decreases at least N times during training.

Example 1

Figure 2:
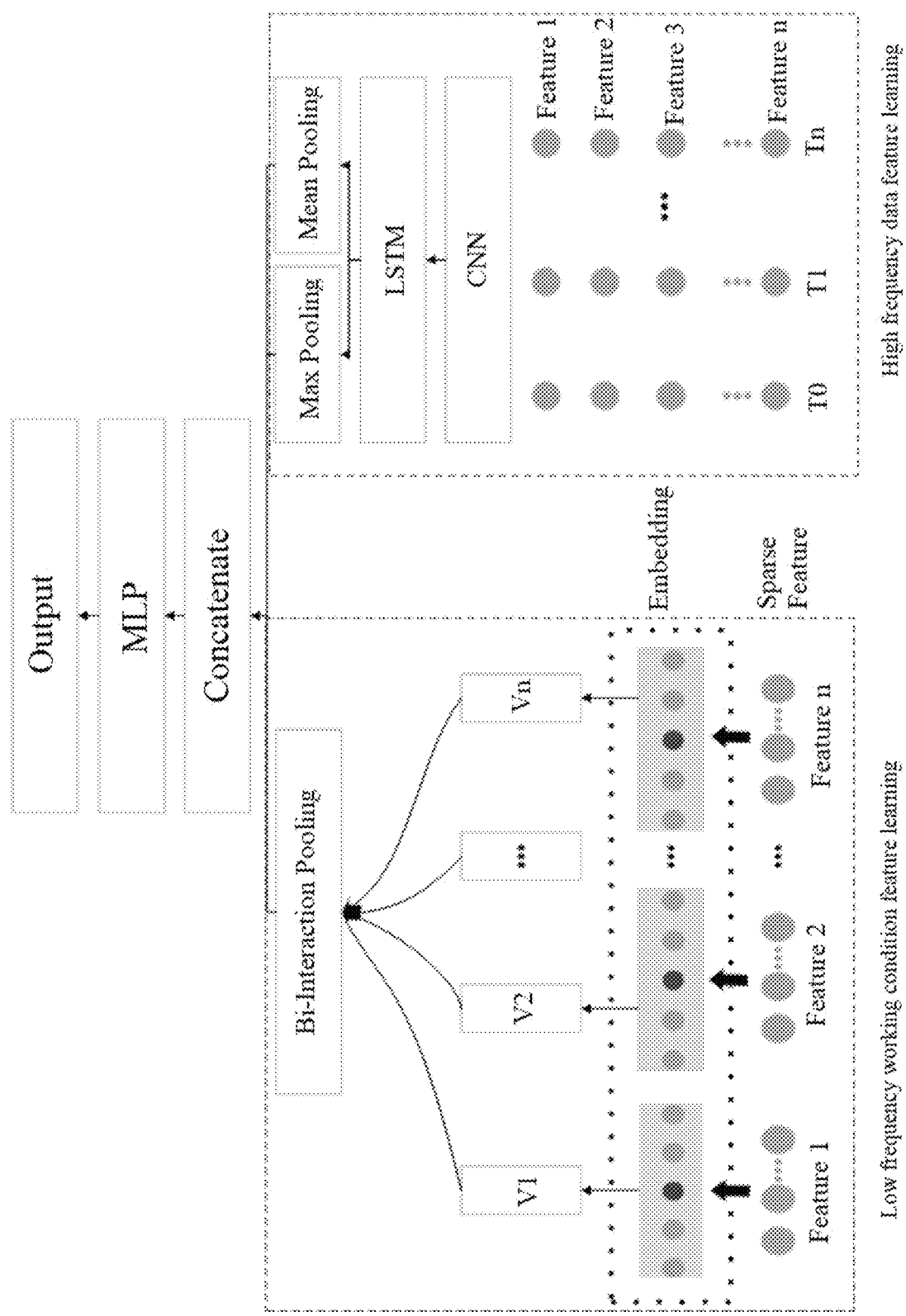
FIG. 2 is a model frame diagram according to an example of the present disclosure.

Referring to FIG. 1 and FIG. 2, PLC controller signals and external sensor signals are collected, and the working condition information and sensor data in the machining process are monitored. The sensor data are mainly current signals and vibration signals in three directions, namely x-axis, y-axis and z-axis, to realize on-line monitoring of tool wear and life prediction. The data acquisition process begins when a brand-new tool executes the machining program and ends when the tool life ends. The sampling frequency of PLC signal is 33 Hz and the sampling frequency of vibration sensor is 25600 Hz. The data set provides a 1-minute segment as a sample every 5 minutes, which is given by the time series 1.csv, 2.csv, . . . , n.csv.

In the example, the original signal data is preprocessed, that is, the vibration signals are processed by sliding window to remove abnormal values and the current signals are processed by sliding filtering, and then the data is normalized; and similarly, the data of working condition signals collected by PLC are also normalized. High frequency data and low frequency data are merged together according to the low sampling frequency, and every 776 sampling points of the high frequency data are merged with 1 sampling point of the low frequency data to generate one sample.

A hybrid neural network model is constructed, that is, the relationship between a tool signal and tool life is modeled. In a high frequency part of the neural network model, the structures of convolutional neural network (CNN) and long short-term memory (LSTM) are adopted for feature extraction, and deep time series features are acquired from the original data by utilizing three convolution layers and a maximum pooling layer of CNN. The numbers of convolution kernels in the three convolution layers are set to 32, 64 and 128. A dropout layer is added between each convolution layer and pooling layer, and parameters are set to 0.3, 0.35 and 0.45, and then features are mined by utilizing a single-layer LSTM after the convolution layer, the number of neurons in the LSTM is set to 128. A Batch Normalization layer and the dropout layer are added after the LSTM, and parameters of the dropout layer are set to 0.45. After the LSTM layer, the GlobalAveragePoolingID layer and Global-MaxPoolingID layer are utilized to acquire the Max Pooling pool vector and the Mean Pooling pool vector respectively. For low frequency data, a neural factor decomposition (NFM) structure is adopted for feature mining. After the input PLC working condition signal is coded by hash, a vector table representing the index is obtained, in which a dimension of the vector table is set to 32, and then the Bi-Interaction Pooling pool vector is obtained by utilizing the BiInteractionPooling layer of NFM.

The obtained high frequency information features and low frequency information features are sent to a three-layer neural network, and hidden layer nerves are set to 128 and 64. A dropout layer is also added after each layer of neural network, the parameter of dropout layer is set to 0.45, and finally a complete neural network structure is formed with the percentage of remaining life value.

In the process of training the hybrid neural network model, the training data is divided into training data set and verification data set. In the training, a mean absolute error loss function is selected as a training error, and Adam is used as an optimization method. An initial learning rate is set to 0.0001, the learning rate is adjusted to the original 0.1 when the learning rate does not reduce every 5 epochs, and an optimal model is obtained by the method of early stopping. The number of early stopping steps is set to 9, that is, when the error of the loss of the verification set no longer drops in 9 times of training, the training is stopped.

Figure 3:
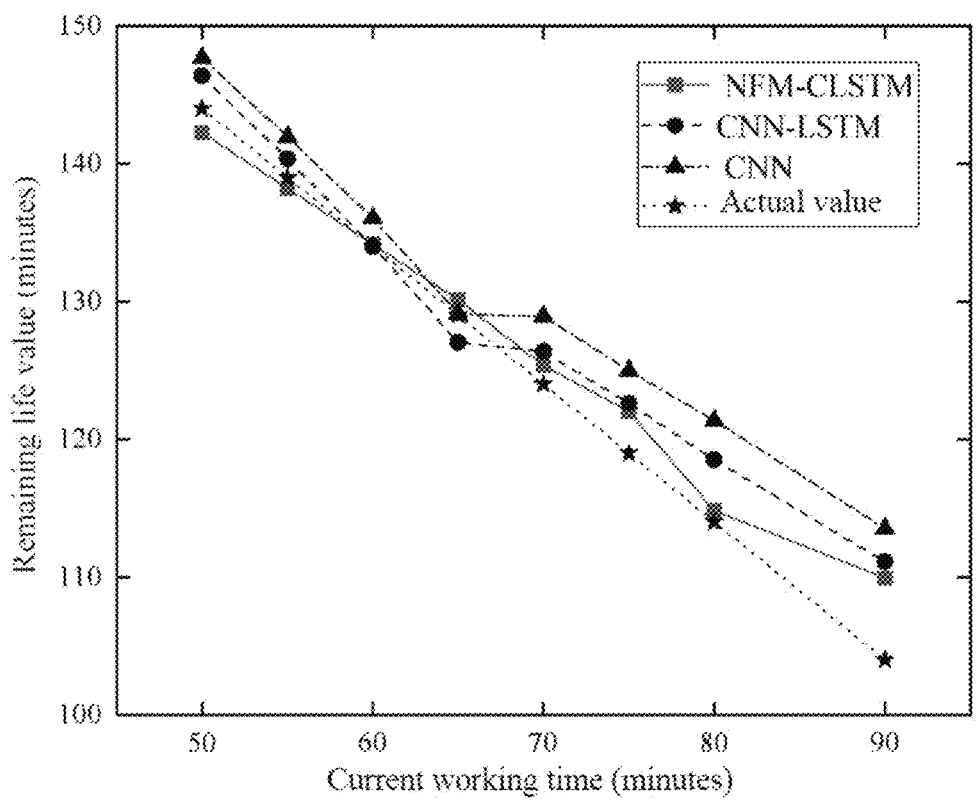
FIG. 3 is a graph for predicting a service life value of a tool 1 according to an example of the present disclosure.
Figure 4:
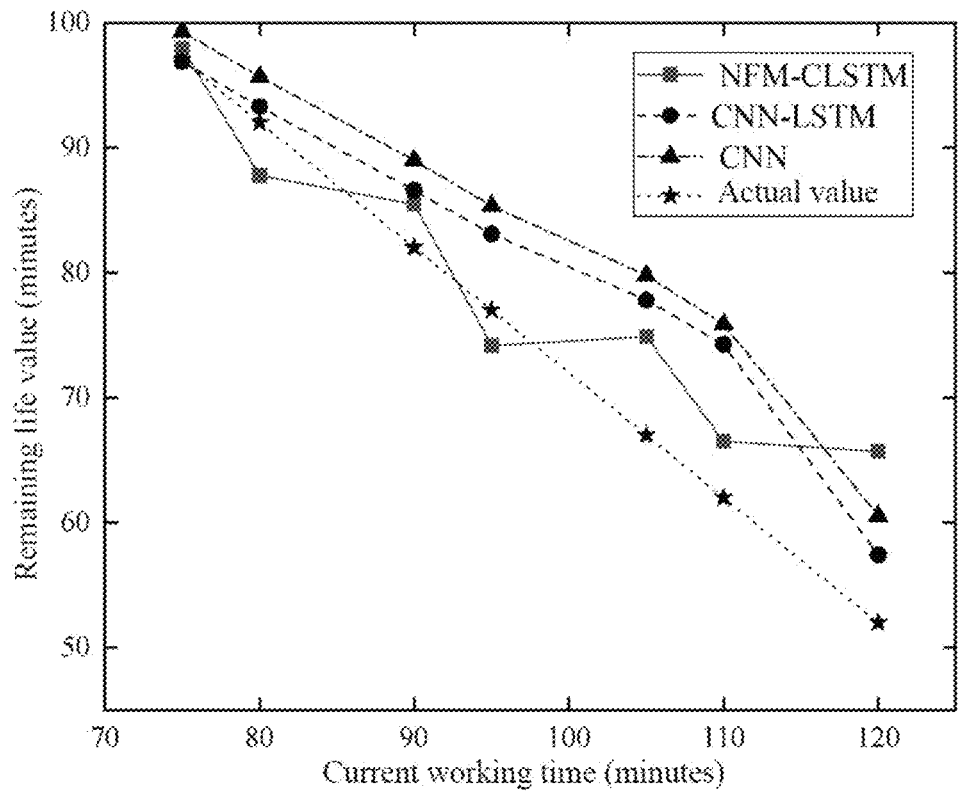
FIG. 4 is a graph for predicting a service life value of a tool 2 according to an example of the present disclosure.
Figure 5:
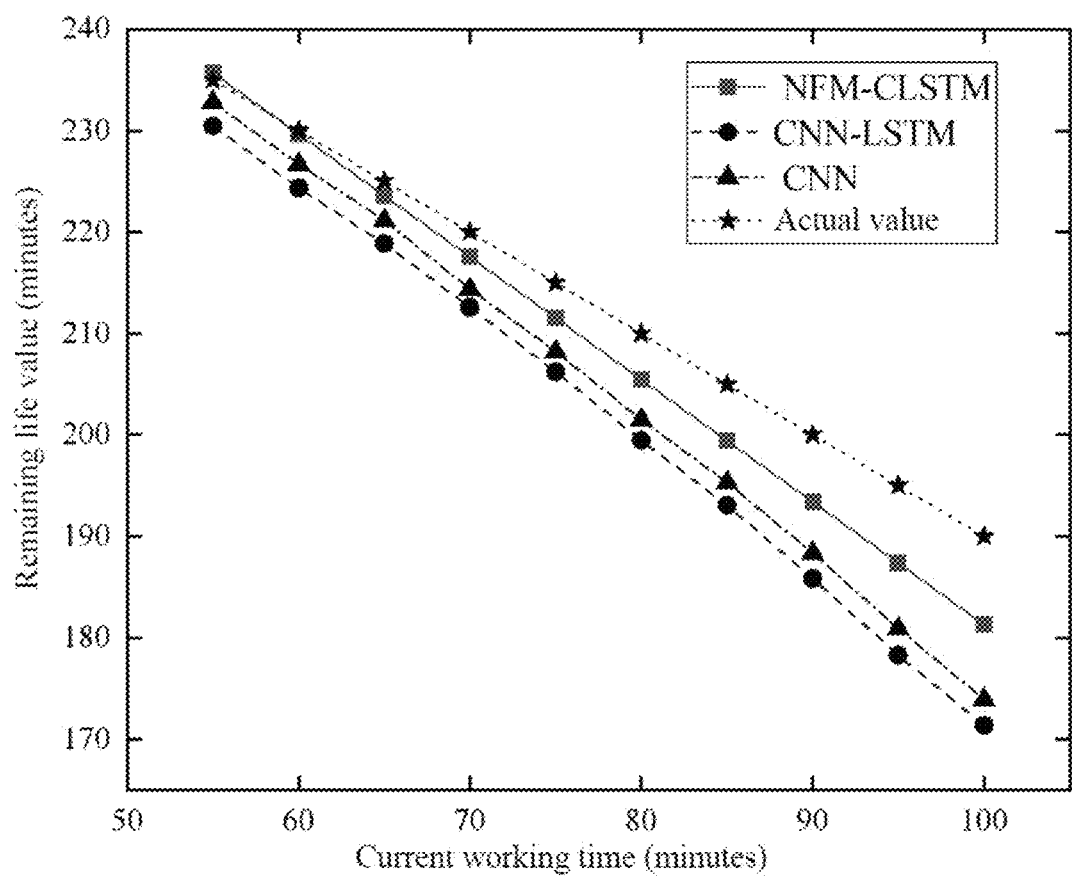
FIG. 5 is a graph for predicting a service life value of a tool 3 according to an example of the present disclosure.

In order to verify the feasibility and accuracy of the method, a test experiment is carried out, and the model is compared with CNN and CNN-LSTM models. A tool remaining life prediction experiment of three tools of different collection time sections under different working conditions was carried out. The tool 1 only provided the collected data of the working time from $40^{th}$ minute to $90^{th}$ minute, the tool 2 only provided the collected data of the working time from $70^{th}$ minute to $120^{th}$ minute, and the tool 3 provided a working interval from $50^{th}$ minute to $100^{th}$ minute. The trend of the remaining life prediction results of the three test tools is shown in FIG. 2, with a current working time as an abscissa and a corresponding remaining life value as an ordinate. The prediction effect is measured by exponential transformation accuracy (ETA), RSME and accuracy, and the comparison results are shown in Table 1. FIGS. 3-5 show the actual service life of the tool 1, tool 2 and tool 3, and the prediction of tool service life by (NFM-CLSTM), CNN and CNN-LSTM models according to the present disclosure. According to the curves in the figures, it can be seen that compared with CNN and CNN-LSTM models, the prediction method of the present disclosure is closer to the actual value in predicting the service life of the tool.

not limited to, disk storage, CD-ROM and optical storage) having computer-usable program codes embody therein.

Various examples in the present application are described in a progressive way, and only the same and similar parts between the various examples can be referred to each other, and each example focuses on the differences from other examples. Especially, for the examples of the electronic device and the computer-readable storage medium, because the examples are basically similar to the method example, the description is relatively simple, and the relevant points can only be referred to the partial description of the method example.

Examples of the subject matter and functional operations described in the present application can be realized in digital electronic circuits, tangibly embodied computer software or firmware, computer hardware that can include the structures disclosed in the present application and structural equivalents, or a combination of one or more thereof. Examples of the subject matter described in the present application can be realized as one or more computer programs, i.e., one or more modules of the computer program instructions encoded on a tangible non-transitory program carrier to be executed by or control the operation of a data processing apparatus. Alternatively or additionally, the program instructions can be encoded on artificially generated propagation signals, such as machine-generated electrical, optical or electromagnetic signals, which are generated to encode and transmit information to an appropriate receiver apparatus for execution by the data processing apparatus. The computer storage medium can be a machine-readable storage device, a machine-readable storage substrate, a random or serial access memory device, or a combination of one or more thereof.

TABLE 1

Comparison table of prediction error results of different neural networks

| Model | ETA | | | | RMSE | | | | Accuracy | | | |
| --- | --- | --- | --- | --- | --- | --- | --- | --- | --- | --- | --- | --- |
| | T1 | T2 | T3 | TA | T1 | T2 | T3 | TA | T1 | T2 | T3 | TA |
| CNN | 57.2 | 37.8 | 76.1 | 57.0 | 5.3 | 8.9 | 9.3 | 7.8 | 96.2 | 88.9 | 96.0 | 93.7 |
| CNN-LSTM | 71.4 | 52.4 | 70.4 | 64.7 | 3.5 | 7.1 | 11.4 | 7.3 | 97.5 | 91.8 | 95.0 | 94.8 |
| NFM-CLSTM | 82.0 | 61.2 | 86.3 | 76.5 | 2.5 | 6.6 | 4.7 | 4.9 | 98.4 | 92.2 | 97.9 | 96.2 |

The present application also provides an electronic device, which includes a processor and a memory. The memory stores computer program instructions, and when the computer program instructions are executed by the processor, the prediction method for the tool remaining life of the numerical control machine tool based on the hybrid neural model described in any of the above examples is realized.

The present application also provides a computer-readable storage medium, which stores a computer program. When the computer program is executed by a computer, the prediction method for the tool remaining life of the numerical control machine tool based on the hybrid neural model described in any of the previous examples is realized.

It is to be understood by those skilled in the art that one or more examples of the present application can be provided as a method, an electronic device or a computer-readable storage medium. Accordingly, one or more examples of the present application can take the forms of an entirely hardware example, an entirely software example or an example combining software and hardware aspects. Moreover, one or more examples of the present application can take the form of a computer program product implemented on one or more computer-usable storage media (which can include, but are The method steps and logic flow described in the present application can be executed by one or more programmable computers executing one or more computer programs to perform corresponding functions by operating according to input data and generating outputs. The method steps and logic flow can also be realized by various circuits for realizing functions, for example, special logic circuits such as field programmable gate array (FPGA) or application specific integrated circuit (ASIC), and electronic devices and media can also be realized by various circuits for realizing functions.

A suitable computer that can be used to execute computer programs can include, for example, a general-purpose and/or special-purpose microprocessor, or any other type of central processing unit. Generally, the central processing unit will receive instructions and data from read-only memory and/or random access memory. The basic components of a computer can include a central processing unit that can be used to implement or execute instructions and one or more memory devices that can be used to store instructions and data. Generally, the computer will also include one or more mass storage devices that can be used to store data, such as magnetic disks, magneto-optical disks or optical disks, or the computer will be operatively coupled with the mass storage device to receive data therefrom or transmit data thereto, or both. However, it is not necessary for a computer to have such a device. Furthermore, the computer can be embedded in another device, such as a mobile phone, a personal digital assistant (PDA), a mobile audio or video player, a game console, a global positioning system (GPS) receiver, or a portable storage device such as a universal serial bus (USB) flash drive. Here are just a few examples.

Computer-readable media suitable for storing computer program instructions and data can include all forms of non-volatile memory, media and memory devices, for example, semiconductor memory devices (such as EPROM, EEPROM and flash memory devices), magnetic disks (such as internal hard disks or removable disks), magneto-optical disks, and CD ROM and DVD-ROM disks. The processor and memory can be supplemented by or incorporated into special logic circuits.

While examples of the present disclosure have been shown and described, it will be understood by those skilled in the art that various changes, modifications, substitutions and alterations may be made herein without departing from the principles and spirit of the present disclosure, the scope of which is defined by the appended claims and equivalents thereof.

The invention claimed is:

1. A prediction method for tool remaining life of a numerical control machine tool based on a hybrid neural model, comprising: constructing a hybrid neural network model, the model comprising a convolutional neural network, a long short-term memory network and an NFM neural network, the prediction of the tool remaining life of the numerical control machine tool specifically comprising the following steps:
S1: constructing samples of PLC working condition signal data and vibration and current signals in a same time period according to the sampling frequency of tool data, and generating sample data based on low frequency PLC sampling points;
S2: learning the sample data by utilizing a sub-model combined by the convolutional neural network and the long short-term memory network to obtain a first feature vector representing the tool life, specifically comprising the following steps:
S21: acquiring an average value of vibration data collected by a sensor by utilizing a triangle window, extracting a variance by a rectangle window to detect abnormal values, filling the average value into abnormal points, performing moving average sequence filtering on the collected current signals, and standardizing the overall data,
S22: building a convolutional neural network layer, performing convolution operation on an input current signal and a vibration signal sequence through K convolution kernels of the convolution layer to obtain K feature vectors, and pooling each feature vector after convolution layer through a maximum pooling layer to obtain a time series containing K local features,
S23: building a single-layer long short-term memory layer, and obtaining a time series containing historical time information through an LSTM layer containing N LSTM neural units, and
S24: acquiring N eigenvalues of LSTM neurons by separately utilizing a Global Average Pooling layer and a Global Max Pooling layer, and taking 2*N eigenvalues as the first feature vector representing the tool life;
S3: generating a learnable vector table of I*M dimension after hashing a working condition signal of each sampling point into an index value by utilizing the NFM neural network, I being an index number and M being an embedding dimension, and acquiring a second feature vector representing the tool life through Bi-Interaction Pooling layer learning; and
S4: inputting a current working time of a tool, the first feature vector representing the tool life and the second feature vector representing the tool life into a multilayer perceptron for fusion, and then learning a whole network structure.

2. The prediction method for tool remaining life of a numerical control machine tool based on a hybrid neural model according to claim 1, wherein the convolutional neural network layer comprises three convolution units, and one convolution unit comprises a convolution layer and a maximum pooling layer.

3. The prediction method for tool remaining life of a numerical control machine tool based on a hybrid neural model according to claim 1, wherein the process of acquiring the second feature vector representing the tool life comprises the following steps:
S31: establishing an I*M vector table according to an index after hash coding the PLC working condition signal data, the vector table being expressed as: $V_x=\{x_i v_i\}$,
I being the index number, M being the embedding dimension, $x_i$ being an input vector, $v_i$ being a mapping vector, and $V_x$ being a vector set; and
S32: acquiring the second feature vector representing the tool life by the acquired vector table $V_x$ through the action of a Bi-Interaction layer.

4. The prediction method for tool remaining life of a numerical control machine tool based on a hybrid neural model according to claim 3, wherein the action process of the vector table $V_x$ through the Bi-Interaction layer is expressed as:

$$f_{BI}(V_x) = \sum_{i=1}^{n} \sum_{j=i+1}^{n} x_i v_i \odot x_j v_j$$

$f_{BI}(V_x)$ being the second feature vector representing the tool life, n being the index number, and $\odot$ representing an element-wise product of two vectors.

5. The prediction method for tool remaining life of a numerical control machine tool based on a hybrid neural model according to claim 1, wherein in the process of training the hybrid neural network model, a Dropout layer is added after a pooling layer of the convolutional neural network, a Bi-Interaction pooling layer of the NFM neural network and each fully connected layer, and a Batch Normalization layer is added after the LSTM layer and the fully connected layer; in the back propagation of the neural network, Adam is utilized to optimize an optimal model, and in the process of optimization, a learning rate is reduced when the loss of epoch verification data no longer decreases every n times, and the training is stopped when the loss of verification data no longer decreases at least N times during training.

* * * * *